Sept. 30, 1969   U. KRABBE   3,470,448
CONTROL SYSTEM FOR A FREQUENCY CONVERTER
Filed Dec. 11, 1967   2 Sheets-Sheet 1

INVENTOR
ULRICH KRABBE
BY Jennings Bailey Jr.
ATTORNEY

Fig. 2
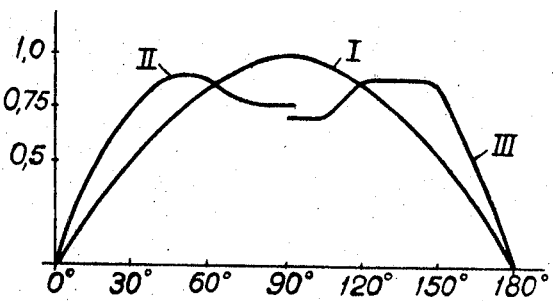
Fig. 3
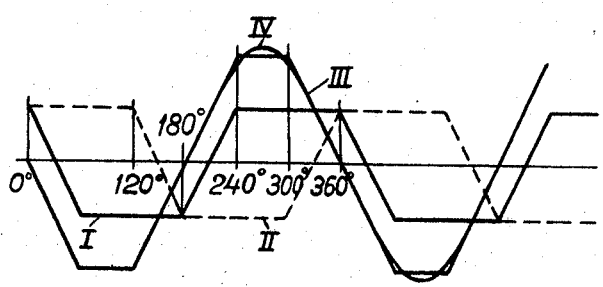
Fig. 4
Fig. 5
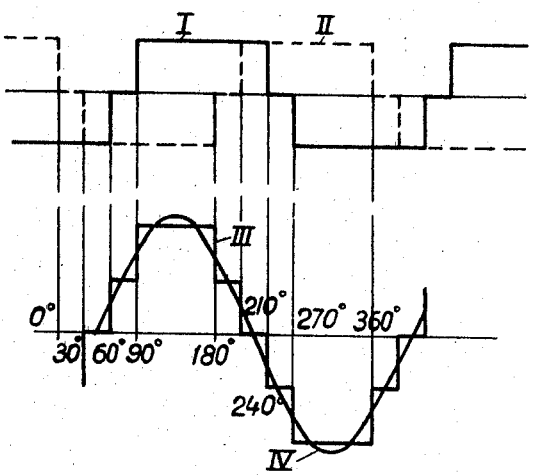
Fig. 6
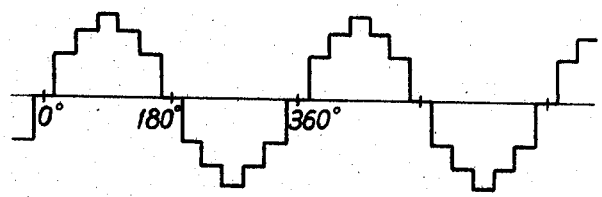

United States Patent Office 3,470,448
Patented Sept. 30, 1969

3,470,448
CONTROL SYSTEM FOR A FREQUENCY CONVERTER
Ulrich Krabbe, Helsinger, Denmark, assignor to Allmanna Svenska Elektriska Aktiebolaget, Vasteras, Sweden
Continuation-in-part of application Ser. No. 590,456, Oct. 22, 1966. This application Dec. 11, 1967, Ser. No. 689,524
Int. Cl. H02m 1/12
U.S. Cl. 321—9     4 Claims

ABSTRACT OF THE DISCLOSURE

A method of controlling a static converter used for converting a multi-phase alternating voltage from one network to a multi-phase alternating voltage in a second network; the converter includes reverse parallel connected rectifiers between the phases of the networks and a common ignition device for all the rectifiers connected to any phase; a reference voltage from the primary network and an A.C. control voltage are combined in such a way that the secondary phases follow the A.C. control voltage; each phase of the A.C. control voltage has a curved shape representing the combination of a fundamental wave and at least one of the harmonics divisible by three so as to reduce the amplitude of the A.C. control voltage at least at its highest amplitude.

CROSS-REFERENCE TO RELATED APPLICATIONS

This application is continuation-in-part of application, Serial No. 590,456, filed October 27, 1966, which is in turn a continuation of application Serial No. 193,101, filed May 8, 1962, both now abandoned.

BACKGROUND OF THE INVENTION

Field of the invention

The invention relates to the control of converters.

The prior art

Converters are known for converting a multi-phase alternating voltage from a primary network to a multi-phase alternating voltage in a secondary network, which comprise a number of reverse parallel connected rectifiers between the phases of the primary network and the phases of the secondary network. Further, said converters comprise a control device of a type which for each secondary phase comprises a common ignition device for the rectifiers connected to this phase, said ignition device being of a known type combining a reference A.C. voltage and a control A.C. voltage such that the respective secondary phases follow the respective phases of said control A.C. voltage. Further the converter comprises a controlling alternating voltage source for derivation of the said control A.C. voltage with a certain desired curve shape.

Said alternating voltage source has the phase number as the secondary network to be able to impart a control voltage to each of the ignition devices pertaining to different phases of the secondary network, and since these ignition devices are so shaped that the phase voltages of the secondary network follow the said control voltage, the desired frequency, amplitude and curve shape in the secondary voltage may be effected by suitable choice of corresponding properties in said control voltage source, just as it is possible in this way to vary said properties in the secondary network by varying corresponding properties in the control voltage source. Converters of this type may, for example, be made of a number of controlled rectifiers in such a way that each phase of the primary network is connected to each phase of the secondary network by means of at least one rectifier in each current direction and such a converter operates in such a way that with the aid of ignition devices and the different rectifiers the different phases of the secondary network at each moment are connected to those phases of the primary network where at the proper moment those voltages arise which are desired in the secondary network. Usually sinusoidal wave form is desired in the secondary voltages, so that sinusoidal wave form is automatically desired in the control voltages. However, it has been found impossible with sinusoidal control voltages to obtain voltages on the secondary side the amplitude of which corresponds to the rectified value of the primary voltage. At the most a secondary amplitude is obtained of the size primary amplitude·cos 60° with three-phase secondary voltage.

SUMMARY OF THE DISCLOSURE

It has been found possible to obtain an improvement if the control voltages instead of being pure sinusoidal have a more flattened curve shape and according to the invention such an improvement is obtained by controlling the converter by means of a control A.C. voltage, each phase of which has a curve shape consisting of a fundamental wave and at least one of the harmonics divisible by three, of such magnitude and phase position that the amplitude of said control voltage is reduced in relation to the amplitude of the fundamental wave at least at the highest occurring amplitude thereof.

As a result of this the phase-voltages of the secondary side will have curve shapes which are flattened in relation to a pure simusoidal curve, which means that the phase-voltages on the secondary side will for a certain period be at maximum value, which maximum value, however, is somewhat less than the maximum value corresponding to the amplitude of the primary voltage. The phase-voltages on the secondary side will thus have the same harmonics divisible by three as the control voltage. The line voltages on the secondary side, on the other hand, will not have these harmonics since the phase harmonics divisible by three will cancel each other in the line voltages. If a line voltage is imagined composed of two phase voltages consisting of fundamental waves sin $v$ and sin $(v+120)$ respectively, together with a third harmonic sin $3v$ and sin $3(v+120)$ respectively, the line voltage may be expressed as the difference between the phase voltages, i.e., sin $v+k°$ sin $3v-$(sin $(v+120)+k°$ sin $3(v+120))=$
sin $v-$sin$(v+120)+k°$ sin $3v-k°$ sin $(3v+360)=$
sin $v-$sin $(v+120)=-\sqrt{3}$ cos $(v+60)$ from which it is seen that the phase harmonics divisible by three do not occur in the line voltage.

This means that it is possible to obtain sinusoidal line voltages with an amplitude corresponding to the amplitude of the primary voltage. If only the line voltages of the secondary network are of interest, that is, when the secondary network has a floating neutral, it is thus possible according to the invention to utilize the converter within practically the whole range of frequency and voltage of the primary network. Thus if three-phase power consumers are connected to the secondary network, such as motors or transformers with floating zero point, these will not be damaged by said harmonics.

Thus, if a normal simple synchronous motor is connected to the secondary network is is possible to alter the number of revolutions of the motor by altering the frequency of the control A.C. voltage source.

The invention will be further described with reference to the accompanying drawings.

BRIEF DESCRIPTION OF THE DRAWINGS

FIGURE 2 shows a half-period of a sine-shaped fundamental wave and two quarter periods of the same fundamental wave together with a third harmonic overtone, and with third and ninth harmonic overtones, respectively.
FIGURE 3 shows the appearance of a line voltage in the secondary network if the control voltages and therewith the phase-voltage of the secondary network, are trapezoidal
and FIGURES 4, 5 and 6 show a similar case with a control voltage consisting of rectangular pulses.

DESCRIPTION OF THE PREFERRED EMBODIMENTS

Figure 1:
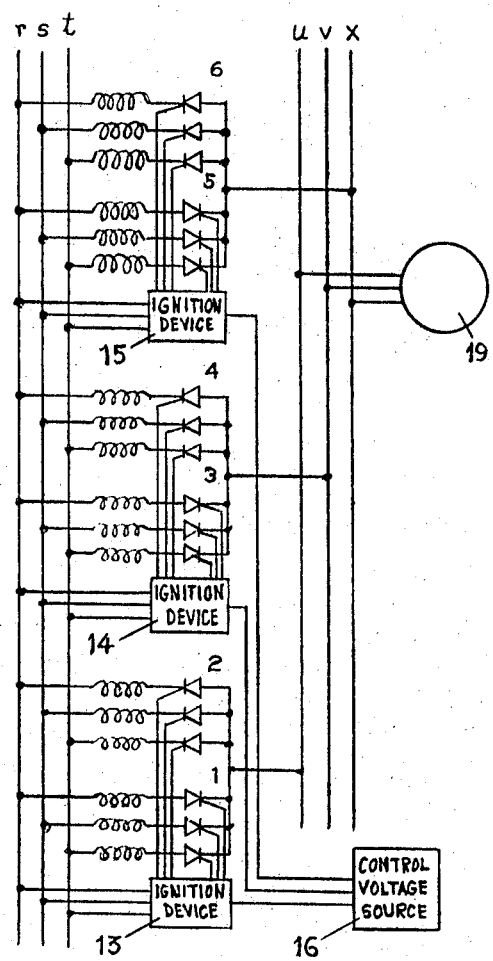
FIGURE 1 shows a converter of a kind known per se.

FIGURE 1 shows a converter for converting a three-phase alternating voltage in a primary network *rst* to a three-phase alternating voltage fed to a three-phase secondary network *uvx*. The invention is however independent of the phase numbers of the two networks. In FIGURE 1 an electrical machine such as an asynchronous motor 19 is connected to the secondary network *uvx*.

The converter comprises a number of rectifiers arranged in groups 1, 2, 3, 4, 5, 6, which in this case are shown as controlled semi-conductor rectifiers. However, the invention is not limited to such an embodiment, but may comprise converters having any type of controlled rectifiers, for example, ionic rectifiers. Each rectifier is connected in series with a reactor to limit the commutating current, but the reactors could for the same purpose be connected in some other way. The figure shows the simplest form of the converter in question, where each phase in the one network is connected with each phase in the other by means of a rectifier in each direction. In the figure the rectifiers connected to one phase of the secondary network are arranged in groups (1, 2; 3, 4; and 5, 6 respectively) with a common ignition device (13, 14 and 15 respectively). These ignition devices (see FIGURE 1a) should be of such a type, known per se, that the resulting output voltage of one group of rectifiers follows a guiding magnitude, for instance the control voltage. In the present case this magnitude is given by a multi-phase control A.C. voltage source 16 having the same number of phases as the secondary network and with variable voltage and frequency.

An ignition device for this purpose operates, for instance, on the principle that it compares suitably in a transformer a magnitude derived from the primary network with the controlling magnitude and that an ignition pulse is transmitted to a rectifier which connects one phase of the primary network with one phase of the secondary network when the corresponding two magnitudes have a certain relation to each other, for example, are equal. According to this principle the secondary voltage *uvx* follow the control voltage from the voltage source 16, that is, the secondary voltage will have the same frequency and curve shape as the control voltage.

Figure 1A:
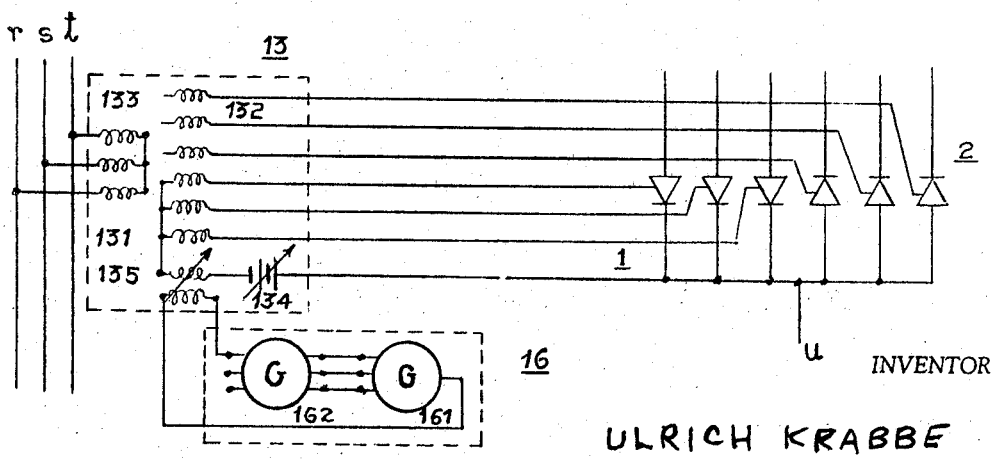
FIGURE 1a shows the ignition device and its connection to the control voltage.

In FIGURE 1a is shown the valve group 1 and its ignition device 13 together with its connection to one phase of the control voltage source 16.

The control electrodes of the rectifiers of valve group 1 are connected each to its own phase of a Y-connected secondary winding 131 of a reference voltage transformer, the primary winding 133 of which is connected to the primary network *rst*. Between the common cathode of valve group 1 and the neutral of the winding 131 is connected in series a variable bias direct voltage source 134 and the secondary winding of a variable transformer 135. The primary winding of this variable transformer is connected to one of the phases of the control voltage source 16.

This control voltage source comprises two series or cascade connected A.C. generators 161 and 162. The generator 161 corresponds in its frequency and voltage magnitude to the desired fundamental frequency and voltage magnitude of the secondary network *uvx*. The voltage of this generator could be regarded as preferably sinusoidal.

In series with the phases of the generator 161 are connected the corresponding phases of the geenrator 162, the frequency of which is three times the frequency of the generator 161 and thus of the secondary network *uvx*. If desired, further generators with frequencies 9 times and so on could be inserted after the generator 162. The generator 162 and possible further generators are suitably made variable as to their voltage magnitude and phase position in order to get the right relations between the fundamental and the harmonics of voltage source 16. As mentioned above, one phase of this voltage source is connected to the variable transformer 135 in the ignition device 13.

In this way the valve group 1 has a control circuit comprising the transformer winding 131, the secondary winding of 135 and the bias voltage source 134 in which circuit the control voltage from 16 is compared with the reference voltage from the network *rst*, and it has been found that with such a control circuit the output voltage of valve group 1 forms a half period of the output phase voltage *u* following the corresponding half period of voltage source 16.

The other half period of output phase voltage *u* comes from valve group 2 and in the device 13 is shown a further secondary winding 132 giving a reference voltage for the valve group 2. As the cathodes of this valve group are not connected together, the control circuit of this group, which is quite equivalent to that of group 1, must be separated in three isolated groups so that the control voltage transformer for this group corresponding to 135 must be provided wtih three separate secondary windings. Thus, for each of the valves in group 2 the control circuit between the control electrode and the cathode comprises the winding 132, a winding corresponding to the secondary winding of 135 and a bias voltage corresponding to 134.

In FIGURE 1a the generators 161 and 162 are shown as rotating machines, but it is quite clear that these rotating machines could be replaced by static generators, for instance oscillators which further could be combined to give output phase voltages with a desired curve shape. Such different curve shapes which could easily be obtained are shown in FIGS. 2–6.

In FIGURE 2 is shown the known curve shape of a sinusoidal fundamental wave I, and if the voltage from the control voltage source has this curve shape analysis shows that the secondary voltage *uvx* also will be sinusoidal. As mentioned above it is however not possible with a sinusoidal control voltage to obtain a secondary voltage with an amplitude corresponding to the rectified value of the primary voltage. By adding a third harmonic overtone as shown in the curve II, the desired flattening of the control curve is obtained. It is seen that the amplitude of the curve II is limited in relation to I. Curve III illustrates a fundamental wave together with a third and a ninth harmonic overtone, by which an even better flattening of the upper part of the curve is obtained, which for practical reasons is an advantage, as it gives a better utilization of the primary voltage, especially at secondary frequencies approaching the primary frequency. It will be seen that this curve comes nearer to trapezoid-shape and such a curve shape could be obtained if the control voltage source 16 of FIGURE 1 in a manner known per se comprises three generators giving said three waves and a combining device in its output circuit.

FIGURE 3 shows the appearance of a line voltage III of the secondary network formed by the combination of two trapezoid-shaped phase voltages I and II from the control voltage source 16, the horizontal sides of which correspond to 120 electrical degrees and the two unparallel sides of which each corresponds to 30 electrical degrees. The curve-shape III emerges immediately as the difference between two such trapezoid-shaped phase voltages I and II displaced 120 electrical degrees in relation to each other and it will be seen that the curve gives a good approximation to a sinusoidal curve IV. Such trapezoid-shaped voltages may be easier to derive than the voltages II and III of FIGURE 2. It is seen that curve III is zero at 180° where I and II intersect each other. Then the difference between I and II increases up to 240° because of the increase of I. From 240° to 300°, I and II and thus also III are constant. From 300° to 360° curve II increases so that the difference curve III decreases to zero at 360°, and so on.

Instead of a control voltage with trapezoid-shaped curve-shape, it may be still more convenient to continue the development and use control voltages I and II, the curve forms of which consist of rectangular pulses indicated in FIGURE 4. The given curves indicate control voltages whose curve-shape for each half period is a rectangular pulse of 150 electrical degrees length, having on either side a voltage-free part of 15 electrical degrees. The control voltage thus has the shape of rectangular pulses of 150 electrical degrees each followed by a voltage free period of 30 electrical degrees. Such a control voltage will cause phase-voltages in the secondary network with similar curve-shape and by subtracting two such phase voltages a line voltage emerges which is indicated by the curve III in FIGURE 5. Even if this curve does not give such a good approximation of a sinusoidal curve IV as the curve III in FIGURE 3, it may be regarded as satisfactory for the operation of a motor 19 as shown in FIGURE 1 since it does not contain lower harmonics. If the phase-voltages arising in such a motor are considered in relation to a floating zero, they will obtain the appearance shown in FIGURE 6, which is even more nearly sinusoidal.

I claim:

1. A static converter for converting a multi-phase alternating voltage from a primary network to a multi-phase alternating voltage in a secondary network, said converter comprising a plurality of reverse-parallel-connected rectifiers between the phases of the primary network and the phases of the secondary network and a control device for each secondary phase; said control device comprising a common ignition device for the rectifiers connected to this phase; said ignition device including means for deriving a reference A.C. voltage from the primary network and a control voltage source for furnishing a control A.C. voltage with a certain curve shape; said control A.C. voltage having a frequency equal to the desired secondary frequency and a curve shape corresponding to the desired curve shape of the secondary phase voltage; means for combining said reference voltage and said control voltage, in such a way that the respective secondary phases follow said control A.C. voltage; said ignition device including means to deliver to the proper rectifier an ignition pulse in response to a certain relationship between the actual values of said two A.C. voltages; the improvement comprising means to flatten the curve shape of said control A.C. voltage so in relation to a pure sinusoidal curve shape that the curve shape is substantially the resultant of a fundamental wave and at least one of the harmonics of the order of $3n$, where $n$ is a whole number; said harmonics having such magnitude and phase position that the amplitude of said control A.C. voltage is reduced in relation to the amplitude of the fundamental wave at least at the highest occurring amplitude thereof.

2. A static converter as claimed in claim 1; the curve shape for each half period of the A.C. control voltage being a trapezoid, one horizontal side of which corresponds to about 120 electrical degrees and the two sides of which are not parallel each corresponds to about 30 electrical degrees.

3. A static converter as claimed in claim 1; the curve shape for each half period of the said A.C. control voltage being a rectangular pulse of 150 electrical degrees length followed by a voltageless period of 30 electrical degrees length.

4. Method of controlling a static converter for converting a multi-phase alternating voltage from a primary network to a multi-phase alternating voltage in a secondary network; said converter comprising a plurality of reverse-parallel-connected rectifiers between the phases of the primary network and the phases of the secondary network and a control device for each secondary phase; and control device comprising a common ignition device for the rectifiers connected to this phase; the step of combining a reference A.C. voltage taken from the primary network and a control A.C. voltage such that the respective secondary phases follow said control A.C. voltage; and delivering from said ignition device to the proper rectifier an ignition pulse in response to a certain relationship between the actual values of said two A.C. voltages; each phase of said control A.C. voltage having a fundamental wave and at least one of the harmonics divisible by three and of such magnitude and phase position that the amplitude of said control A.C. voltage is reduced in relation to the amplitude of the fundamental wave at least at the highest occurring amplitude thereof.

References Cited

UNITED STATES PATENTS

| 2,442,257 | 5/1948 | Boyer | 321—61 |
| 3,256,244 | 6/1966 | Byloff et al. | 321—61 |
| 3,332,002 | 7/1967 | Jollois | 321—61 |

JOHN F. COUCH, Primary Examiner

E. GOLDBERG, Assistant Examiner

U.S. Cl. X.R.

318—227; 321—69